Patented Dec. 27, 1949

2,492,743

UNITED STATES PATENT OFFICE 2,492,743

MANUFACTURE OF ANTHRAQUINONE DERIVATIVES

Paul Grossmann, Binningen, Switzerland, assignor to Ciba Limited, a Swiss firm

No Drawing. Application October 8, 1947, Serial No. 778,735. In Switzerland October 15, 1946

4 Claims. (Cl. 260—380)

According to this invention anthraquinone derivatives are made by reacting a 1-amino-2-halogen-4-hydroxyanthraquinone with a solution of a caustic alkali in an alcohol.

The 1-amino-2-halogen-4-hydroxyanthraquinones used as starting materials in this invention may contain as halogen, for example, chlorine or more especially bromine. As alcoholic caustic alkalies there are used with advantage mixtures of an alcohol of the lower aliphatic series, for example, ethyl alcohol or more especially methyl alcohol, with a caustic alkali such as sodium hydroxide or potassium hydroxide. In many cases it is of advantage to work in the absence of appreciable quantities of water.

For carrying out the reaction the starting material may be heated with the alcoholic solution of a caustic alkali, for example, under pressure at a temperature above 100° C. In many cases it is of advantage to use a temperature above 130° C., for example, a temperature of about 140° C. or higher. It is also recommended to use a quantity of alkali hydroxide which is approximately equivalent to the amount of halogen to be exchanged, and which exceeds that amount by not more than 50 per cent., for example, by about 25 per cent.

Furthermore, it is in many cases of advantage to keep the concentration of the alkali hydroxide in the reaction medium relatively low, for example, below about 3 per cent. and advantageously between about 1 and 2 per cent. This can be accomplished in a simple manner by using a very large excess of the alcohol in question, especially methyl alcohol, the excess acting at the same time as a solvent.

By the process of this invention there can be made, inter alia, the known 1-amino-2-methoxy-4-hydroxyanthraquinone, which is a valuble dyestuff for cellulose acetate rayon. It is known to react 1:4-diamino-2-bromanthraquinone with a solution of potassium hydroxide in methanol to produce 1:4-diamino-2-methoxyanthraquinone. However, in this known process a very considerable excess of potassium hydroxide greater than an excess of 100 per cent. is used, and the concentration of potassium hydroxide in the reaction mixture exceeds 5 per cent. If an attempt is made to use this known process for making the products obtainable by the process of this invention entirely unsatisfactory results are obtained, so that it is surprising that the present process should succeed.

The following example illustrates the invention, the parts being by weight.

*Example*

112 parts of 1-amino-2-bromo-4-hydroxyanthraquinone are heated in 1900 parts of methanol with 25 parts of potassium hydroxide for 12 hours at 140° C., while stirring, in an autoclave provided with a stirring device. The whole is then allowed to cool, and the resulting 1-amino-2 - methoxy - 4 - hydroxyanthraquinone of the formula

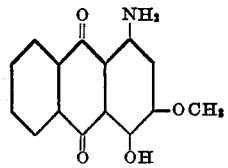

is separated by filtration and washed first with methanol and then with water. The product may then be dried or pasted in the usual manner. In aqueous dispersion it dyes cellulose acetate rayon yellowish pink tints. It is to be understood that while the preferred mode of operation has been described above the invention is not restricted thereto, obvious alterations being possible.

What I claim is:

1. Process for the manufacture of a 1-amino-2-alkoxy-4-hydroxyanthraquinone which comprises heating to a temperature above 130° C. a 1-amino - 2 - halogen - 4 - hydroxyanthraquinone with a solution of a caustic alkali in a monohydric alcohol of the lower aliphatic series containing about one to one and a half mols of caustic alkali per mol of 1-amino-2-halogen-4-hydroxyanthraquinone being heated.

2. Process for the manufacture of 1-amino-2-methoxy-4-hydroxyanthraquinone which comprises heating to a temperature above 130° C. a 1-amino - 2 - halogen - 4 - hydroxyanthraquinone with a solution of a caustic alkali in methyl alcohol containing about one to one and a half mols of caustic alkali per mol of 1-amino-2-halogen-4-hydroxyanthraquinone being heated.

3. Process for the manufacture of 1-amino-2-methoxy-4-hydroxyanthraquinone which comprises heating to a temperature above 130° C. 1-amino-2-bromo-4-hydroxyanthraquinone with a solution of a caustic alkali in methyl alcohol containing about one to one and a half mols of caustic alkali per mol of 1-amino-2-bromo-4-hydroxyanthraquinone being heated.

4. Process for the manufacture of 1-amino-2-methoxy-4-hydroxyanthraquinone which comprises heating to a temperature above 130° C.

1-amino-2-bromo-4-hydroxyanthraquinone with a solution of potassium hydroxide in methyl alcohol containing about one to one and a half mols of potassium hydroxide per mol of 1-amino-2-bromo-4-hydroxyanthraquinone being heated.

PAUL GROSSMANN.

REFERENCES CITED

The following references are of record in the file of this patent:

UNITED STATES PATENTS

| Number | Name | Date |
|---|---|---|
| 1,964,971 | Albrecht et al. | July 3, 1934 |

FOREIGN PATENTS

| Number | Country | Date |
|---|---|---|
| 729,413 | France | Apr. 26, 1932 |
| 558,433 | Great Britain | Jan. 5, 1944 |

Certificate of Correction

Patent No. 2,492,743                                           December 27, 1949

PAUL GROSSMANN

It is hereby certified that error appears in the printed specification of the above numbered patent requiring correction as follows:

Column 2, line 15, right-hand portion of the formula, for "—$OCH_3$" read —$OCH_2$; and that the said Letters Patent should be read with this correction therein that the same may conform to the record of the case in the Patent Office.

Signed and sealed this 25th day of April, A. D. 1950.

[SEAL]

THOMAS F. MURPHY,
*Assistant Commissioner of Patents.*

Certificate of Correction

December 27, 1949

Patent No. 2,492,743

PAUL GROSSMANN

It is hereby certified that error appears in the printed specification of the above numbered patent requiring correction as follows:

Column 2, lines 11 to 17, inclusive, for that portion of the formula reading

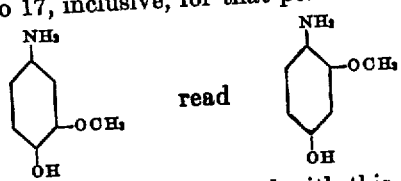

and that the said Letters Patent should be read with this correction therein that the same may conform to the record of the case in the Patent Office.

This certificate supersedes Certificate of Correction issued April 25, 1950.

Signed and sealed this 11th day of July, A. D. 1950.

[SEAL]

THOMAS F. MURPHY,
*Assistant Commissioner of Patents.*